(12) United States Patent
Lee

(10) Patent No.: US 6,291,368 B1
(45) Date of Patent: Sep. 18, 2001

(54) ELASTIC CRACK TAPE

(76) Inventor: Wen-Wang Lee, 5F, No. 72, Ta-Te First Street, Tao-Yuan City (TW)

( * ) Notice: Subject to any disclaimer, the term of this patent is extended or adjusted under 35 U.S.C. 154(b) by 0 days.

(21) Appl. No.: 09/429,782

(22) Filed: Oct. 28, 1999

(51) Int. Cl.[7] ............................ B32B 27/12; B32B 15/04
(52) U.S. Cl. .............................. 442/6; 442/16; 442/38; 442/49; 442/52
(58) Field of Search ........................... 442/6, 16, 38, 442/49, 52

(56) References Cited

U.S. PATENT DOCUMENTS

| | | | |
|---|---|---|---|
| 244,557 | * | 7/1881 | Crawford .......................... 442/52 X |
| 3,072,512 | * | 1/1963 | Dalle .................................. 442/38 X |
| 6,128,793 | * | 10/2000 | Weinstein ................................. 4/631 |
| 6,183,835 | * | 2/2001 | Cho et al. .......................... 442/49 X |

\* cited by examiner

*Primary Examiner*—Daniel Zirker
(74) *Attorney, Agent, or Firm*—Pro-Techtor International Services

(57) ABSTRACT

An elastic crack tape in the form of continuous strip for repairing a crack on a wall. The tape includes a middle layer of net that has elastic material applied over two sides thereof. The elastic material extends into some meshes of the net to firmly associate with the net. The elastic material has elasticity sufficient to absorb deformation of the repaired wall caused by expansion or contraction of the wall due to changes in temperature, and thereby protects the middle layer of net from undesirable tearing or compression.

2 Claims, 4 Drawing Sheets

ELASTIC CRACK TAPE

BACKGROUND OF THE INVENTION

The present invention relates to a crack tape for repairing cracks on a wall surface, and more particularly to an elastic crack tape that includes a middle layer of net having elastic material applied over two sides thereof.

It is a common practice to repair a crack on a wall surface either by cutting off areas on the wall along two sides of the crack and filling the cut areas with concrete, or simply by applying a crack tape over the crack.

A conventional crack tape is usually made of fiber glass or cotton paper strip and includes only one single layer. When the conventional crack tape is used to repair a crack on the wall, the tape is directly applied onto the wall above the crack through bonding agent. Thereafter, the repaired wall is painted or plastered. In a more careful manner, areas on the wall along two sides of the crack are also cut off to provide a recess into which the crack tape is applied to cover the crack before the recess is filled with stucco and finished with paint.

Such one-layer crack tape made of fiber glass or cotton paper strip and directly applied over a crack through bonding agent tends to tear apart or deform under compression when the wall area near the crack expands or contracts due to changes in temperature. The torn or deformed crack tape loses its ability of repairing the crack. Another important factor causing the tear or deformation of the crack tape is the bonding agent that has a property completely different from that of the crack tape.

It is therefore tried by the inventor to develop an elastic crack tape to eliminate the problem of the conventional crack tapes that has a material different from the bonding agent for adhering the crack tape to the cracked wall and tends to tear or deform under expansion or contraction of the crack wall.

SUMMARY OF THE INVENTION

A primary object of the present invention is to provide an elastic crack tape that would not easily become torn or deformed due to expansion or contraction of the cracked wall caused by changes in temperature.

To achieve the above and other objects, the elastic crack tape of the present invention mainly includes a middle layer of metal or plastic net that has elastic material applied over two sides thereof. The elastic material extends into some meshes of the net to firmly associate with the net. The elastic material has elasticity sufficient to absorb deformation of the repaired wall caused by expansion or contraction of the wall due to changes in temperature, and thereby protects the middle layer of net from undesirable tearing or compression.

BRIEF DESCRIPTION OF THE DRAWINGS

The objects, the features, and the functions of the present invention can be best understood by referring to the following detailed description of the preferred embodiments and the accompanying drawings, wherein.

DETAILED DESCRIPTION OF THE PREFERRED EMBODIMENTS

Figure 1:
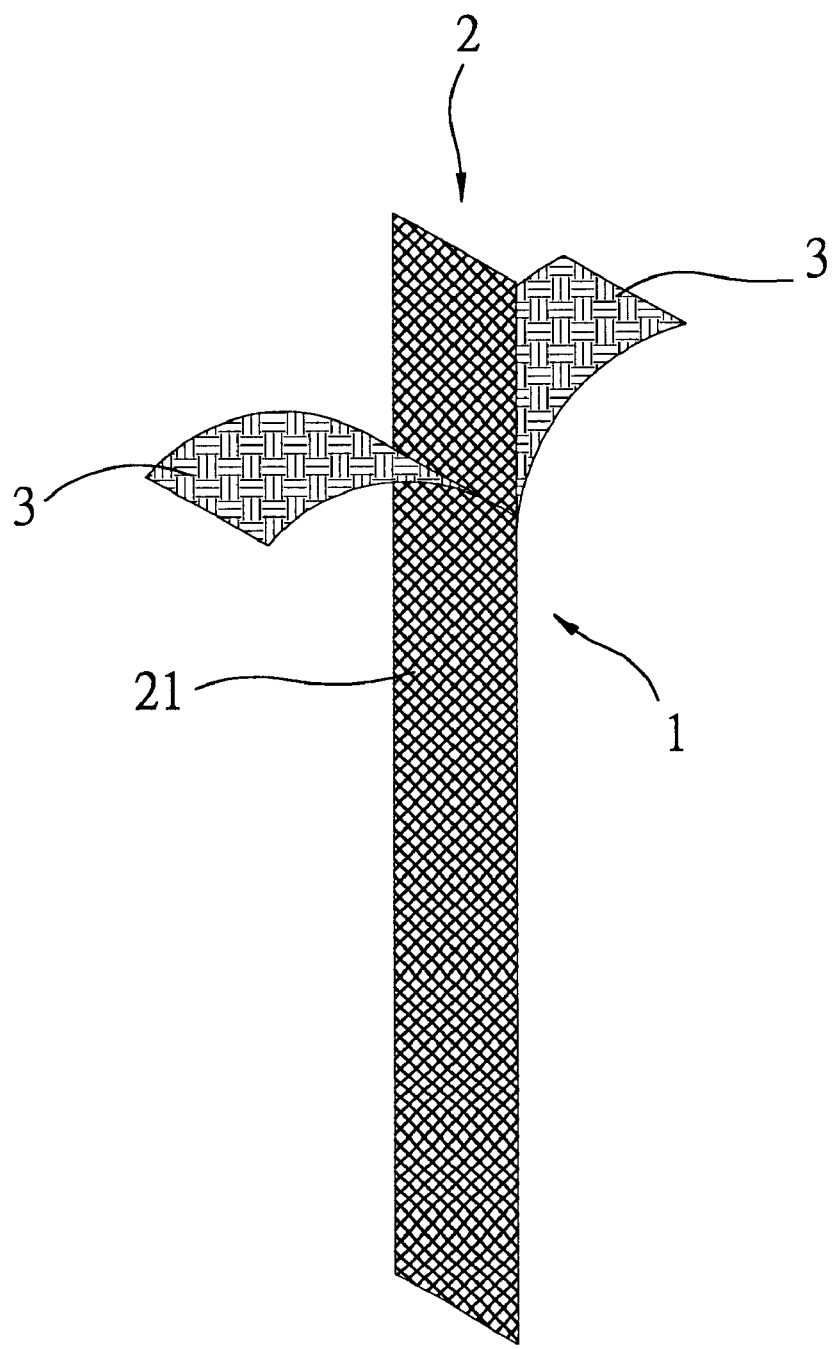
FIG. 1 is a partially disassembled perspective of an elastic crack tape according to the present invention.

Please refer to FIG. 1 that shows a length of an elastic crack tape 1 according to the present invention. An end of the elastic crack tape 1 is peeled apart to show the structure thereof. The elastic crack tape 1 is in the form of a continuous strip and includes a middle layer of net 2, and two outer layers of elastic material 3 applied over two surfaces of the middle net layer 2. The net 2 may be either a metal net or a plastic net, or any other material with suitable strength. The two layers of elastic material 3 extend into some meshes 21 of the net 2 to firmly associate with the net 2 to form an integral body of the elastic crack tape 1.

Figure 2:
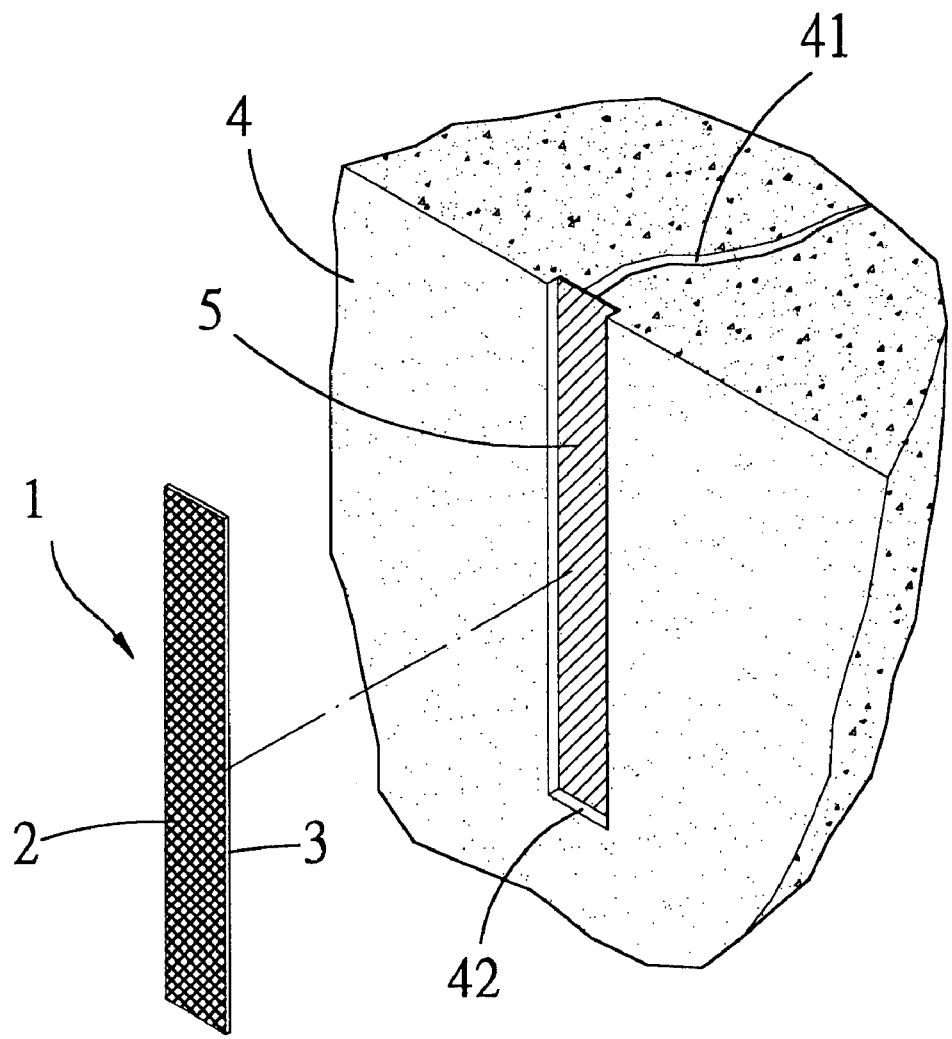
FIG. 2 shows the manner of using the elastic crack tape of FIG. 1 to repair a cracked wall.
Figure 3:
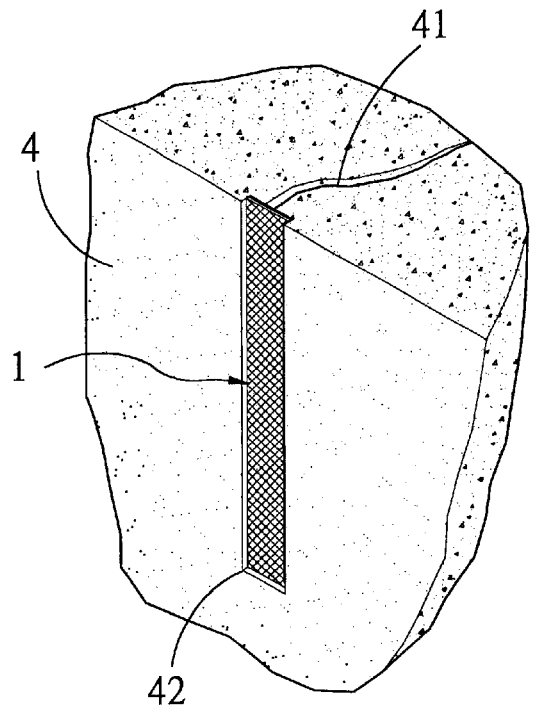
FIG. 3 shows the elastic crack tape of FIG. 1 has been attached to a cracked wall.
Figure 4:
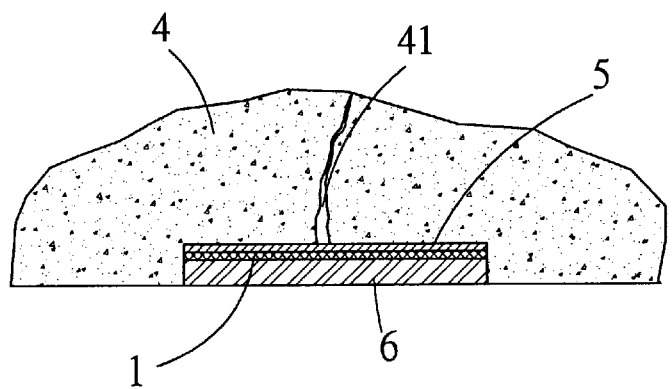
FIG. 4 is a sectional view showing a cracked wall repaired with the elastic crack tape of FIG. 1.
Figure 5:
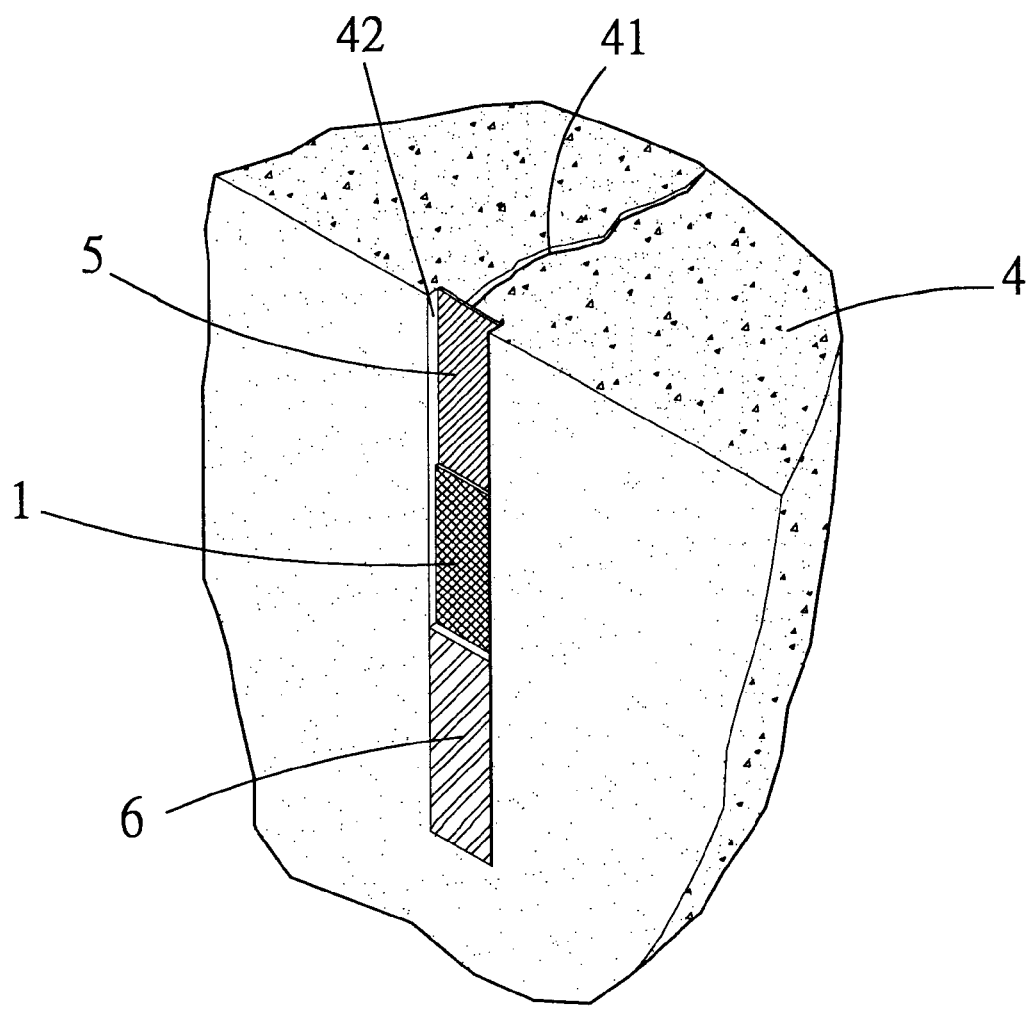
FIG. 5 is a perspective view of a cracked wall repaired with the elastic crack tape of FIG. 1 with a portion of the repaired area cutaway to show the structure thereof.

Please refer to FIGS. 2 to 5 that show the manner of using the elastic crack tape 1 to repair a crack 41 on a wall surface 4. First, areas on the wall surface 4 along two sides of the crack 41 are cut to provide a shallow recess 42. A suitable amount of elastic material 5 that has the same property as that of the elastic material 3 is filled in the recess 42 to serve as a bonding agent, as shown in FIG. 2. Then, a suitable length of the elastic crack tape 1 is cut and used to apply on the elastic material 5 in the recess 42 with the layer of elastic material 3 at one side of the elastic crack tape 1 fitly contacting with the elastic material 5, as shown in FIG. 3. Finally, an amount of suitable stucco is applied on the elastic crack tape 1 in the recess 42 to finish the cracked wall surface 4, as shown in FIG. 4. After the crack 41 is repaired with the elastic crack tape 1 and the recess 42 is finished with the stucco, the wall surface 4 may be painted depending on actual need to beautify the wall surface 4.

Since the two layers of elastic material 3 on the crack tape 1 is the same as the elastic material 5 used as the bonding agent, the elastic material 3 may have sufficient elasticity to absorb any deformation of the wall surface 4 caused by expansion and/or contraction due to changes in temperature. This protects the middle layer of net 2 of the crack tape 1 from undesired tearing or deformation due to compression. That is, the elastic crack tape 1 is physically stable to ensure a prolonged repair effect.

From the above description, it can be understood that the elastic crack tape 1 of the present invention has novel structure and is superior to the conventional crack tapes in terms of repairing a crack on a wall.

What is to be noted is the form of the present invention shown and disclosed is to be taken as a preferred embodiment of the invention. Various changes in the shape, size, and arrangements of parts may be resorted to without departing from the spirit of the invention or the scope of the subjoined claims.

What is claimed is:

1. An elastic crack tape in a form of continuous strip used to repair a crack on a wall surface, comprising a middle layer of net and two outer layers of elastic material applied over two surfaces of said middle net layer; said two layers of elastic material extend into some meshes of said net to firmly associate with said net to form an integral body of said elastic crack tape; and said elastic material being so selected that it has an elasticity sufficient to absorb any deformation of said wall surface around said crack caused by expansion or contraction of said wall due to changes in temperature and thereby protects said middle layer of net from tearing or deformation due to compression.

2. An elastic crack tape as claimed in claim 1, wherein said net forming said middle layer of said elastic crack tape may be either a metal net or a plastic net, or any other material with suitable strength.

* * * * *